(12) United States Patent
Sordo et al.

(10) Patent No.: US 10,699,593 B1
(45) Date of Patent: Jun. 30, 2020

(54) PERFORMANCE SUPPORT INTEGRATION WITH E-LEARNING SYSTEM

(75) Inventors: Mark D. Sordo, Santa Cruz, CA (US); Kevin McClure, San Francisco, CA (US)

(73) Assignee: PEARSON EDUCATION, INC., New York, NY (US)

( * ) Notice: Subject to any disclaimer, the term of this patent is extended or adjusted under 35 U.S.C. 154(b) by 3454 days.

(21) Appl. No.: 11/160,098

(22) Filed: Jun. 8, 2005

(51) Int. Cl.
*G09B 19/00* (2006.01)
*G09B 5/00* (2006.01)
*G09B 5/02* (2006.01)
*G09B 19/06* (2006.01)

(52) U.S. Cl.
CPC .............. *G09B 19/00* (2013.01); *G09B 5/00* (2013.01); *G09B 5/02* (2013.01); *G09B 19/06* (2013.01)

(58) Field of Classification Search
USPC ....... 434/118, 350, 362, 322, 323, 353, 247; 705/23; 706/45, 47
See application file for complete search history.

(56) References Cited

U.S. PATENT DOCUMENTS

| | | | | |
|---|---|---|---|---|
| 4,502,128 A * | 2/1985 | Okajima et al. | ............ | 704/8 |
| 4,984,177 A * | 1/1991 | Rondel et al. | ............ | 704/277 |
| 4,994,966 A * | 2/1991 | Hutchins | ............ | 704/9 |
| 5,727,950 A * | 3/1998 | Cook et al. | ............ | 434/350 |
| 5,813,862 A * | 9/1998 | Merzenich et al. | ........... | 434/185 |
| 5,907,831 A * | 5/1999 | Lotvin et al. | ............ | 705/14.27 |
| 5,927,988 A * | 7/1999 | Jenkins et al. | ............ | 434/116 |
| 5,944,790 A * | 8/1999 | Levy | ............ | 709/218 |
| 5,974,372 A * | 10/1999 | Barnes et al. | ............ | 704/8 |
| 6,016,467 A * | 1/2000 | Newsted et al. | ............ | 704/9 |
| 6,029,043 A * | 2/2000 | Ho et al. | ............ | 434/350 |
| 6,112,049 A | 8/2000 | Sonnenfeld | | |
| 6,118,973 A | 9/2000 | Ho et al. | | |
| 6,149,441 A * | 11/2000 | Pellegrino et al. | ........... | 434/350 |
| 6,160,987 A * | 12/2000 | Ho et al. | ............ | 434/350 |
| 6,162,060 A * | 12/2000 | Richard et al. | ............ | 434/118 |
| 6,164,974 A * | 12/2000 | Carlile et al. | ............ | 434/322 |
| 6,253,202 B1 * | 6/2001 | Gilmour | ............ | 707/9 |
| 6,270,351 B1 | 8/2001 | Roper | | |
| 6,322,366 B1 * | 11/2001 | Bergan et al. | ............ | 434/118 |
| 6,343,319 B1 | 1/2002 | Abensour et al. | | |
| 6,347,943 B1 * | 2/2002 | Fields et al. | ............ | 434/118 |
| 6,370,355 B1 * | 4/2002 | Ceretta et al. | ............ | 434/350 |
| 6,424,983 B1 * | 7/2002 | Schabes et al. | ............ | 715/257 |
| 6,470,171 B1 * | 10/2002 | Helmick et al. | ............ | 434/362 |
| 6,533,583 B1 | 3/2003 | Sportelli | | |
| 6,554,618 B1 * | 4/2003 | Lockwood | ............ | 434/322 |

(Continued)

*Primary Examiner* — Robert J Utama
(74) *Attorney, Agent, or Firm* — Quarles and Brady LLP

(57) ABSTRACT

Techniques are used to improve an e-learning or on-line learning experience for individual users. In an e-learning system, users are at client computers of a distributed network. The users are instructed via a server, connected to the clients through the network. The server has study plans of course units for each user. Study plans are customized for each user. Further, each client computer has desktop support tools, such as a toolbar, which can provide convenience feature for the user or be used to monitor the user's day-to-day activities at the computer. Based on the user's use of the desktop support tools, the study plans at the server may be modified to provide further customization of the e-learning experience for the user.

43 Claims, 7 Drawing Sheets

(56) References Cited

U.S. PATENT DOCUMENTS

| | | | |
|---|---|---|---|
| 6,606,480 B1* | 8/2003 | L'Allier et al. | 434/362 |
| 6,651,071 B1 | 11/2003 | O'brien et al. | |
| 6,658,398 B1* | 12/2003 | Bertrand et al. | 706/47 |
| 6,669,485 B2* | 12/2003 | Thean et al. | 434/365 |
| 6,732,090 B2* | 5/2004 | Shanahan et al. | 707/3 |
| 6,755,657 B1* | 6/2004 | Wasowicz | 434/167 |
| 6,816,702 B2* | 11/2004 | Kuntz et al. | 434/353 |
| 6,884,074 B2 | 4/2005 | Theilmann | |
| 6,921,268 B2 | 7/2005 | Bruno et al. | |
| 6,975,833 B2 | 12/2005 | Theilmann | |
| 6,978,115 B2 | 12/2005 | Whitehurst et al. | |
| 7,050,753 B2 | 5/2006 | Knutson | |
| 7,380,203 B2* | 5/2008 | Keely et al. | 715/230 |
| 2002/0087416 A1* | 7/2002 | Knutson | 705/23 |
| 2002/0142278 A1* | 10/2002 | Whitehurst et al. | 434/350 |
| 2002/0144124 A1* | 10/2002 | Remer et al. | 713/182 |
| 2002/0188583 A1* | 12/2002 | Rukavina et al. | 706/45 |
| 2003/0033312 A1* | 2/2003 | Koizumi et al. | 707/100 |
| 2003/0039948 A1* | 2/2003 | Donahue | 434/322 |
| 2003/0129574 A1* | 7/2003 | Ferriol et al. | 434/362 |
| 2003/0152903 A1* | 8/2003 | Theilmann | 434/350 |
| 2003/0152904 A1* | 8/2003 | Doty, Jr. | 434/350 |
| 2003/0154176 A1* | 8/2003 | Krebs et al. | 706/59 |
| 2003/0190593 A1 | 10/2003 | Wisnosky et al. | |
| 2003/0211447 A1* | 11/2003 | Diesel et al. | 434/118 |
| 2003/0232316 A1 | 12/2003 | Bookout | |
| 2004/0002049 A1* | 1/2004 | Beavers et al. | 434/350 |
| 2004/0014017 A1* | 1/2004 | Lo | 434/322 |
| 2004/0018479 A1* | 1/2004 | Pritchard et al. | 434/350 |
| 2004/0063085 A1 | 4/2004 | Ivanir et al. | |
| 2004/0076941 A1 | 4/2004 | Cunningham et al. | |
| 2004/0078204 A1 | 4/2004 | Segond et al. | |
| 2004/0110119 A1* | 6/2004 | Riconda et al. | 434/350 |
| 2004/0161728 A1 | 8/2004 | Benevento, II et al. | |
| 2004/0191744 A1 | 9/2004 | Guirguis | |
| 2004/0248074 A1 | 12/2004 | Hoyashita et al. | |
| 2005/0026131 A1 | 2/2005 | Elzinga et al. | |
| 2005/0055630 A1* | 3/2005 | Scanlan | 715/513 |
| 2005/0058978 A1 | 3/2005 | Benevento, II | |
| 2005/0164153 A1 | 7/2005 | Beatty et al. | |
| 2006/0014129 A1 | 1/2006 | Coleman et al. | |

\* cited by examiner

PERFORMANCE SUPPORT INTEGRATION WITH E-LEARNING SYSTEM

BACKGROUND OF THE INVENTION

This invention relates to the field of e-learning systems. More particularly, the subject matter relates to techniques for customizing the e-learning experience for individual users, thus improving the overall learning experience.

Education is one of the most important segments and industries of modern society, and provides the foundation for the future development success of our society. The computer revolution and Internet have brought about techniques of training people remotely, instead of in a classroom. This field may be referred to as electronic or e-learning. Compared to traditional classroom instruction, e-learning provides greater convenience. For example, a course is more easily accessible by users in remote or different geographic areas, users in different time zones, users with handicaps, and users with different schedules. E-learning provides convenience to users and a single e-learning system can reach many more users, which lowers the cost of education.

There is a need for improved techniques of e-learning in order to improve the e-learning experience. An aspect of e-learning is to train users on a subject or concepts in as short a time as possible, especially compared to classroom instruction. One technique to do this is to provide a customized study plan or course of study for each user, so that their individual objectives and their strengths and weaknesses are taken into account.

Providing a truly effective study plan, however, requires a deep understanding of the user's real-world needs. The effectiveness of the study plan is dependent on the system's understanding of the concepts that the user needs to understand in everyday situations and of his or her strengths and weaknesses. It is not enough simply to administer an assessment test or an initial interview. These do not give the system accurate information about the user's actions in their daily life. This information is obtained in an artificial situation and it is difficult or even impossible to tailor a general assessment test or interview to the very specific needs of an individual. In addition, these assessment tools give a picture of an individual's needs for only a point in time. They do not allow a continuous evaluation of the user's changing ability and needs.

Therefore, it is desirable to provide techniques to gather information about users' needs during their real-world activities in order to better understand, over a long period of time, their ability to perform assigned tasks. This would allow customization of their course of study in order to include activities that focus on their authentic needs and help them ameliorate areas of weakness.

SUMMARY OF THE INVENTION

Techniques are used to improve an e-learning or on-line learning experience for individual users. In an e-learning system, users are at client systems (computers, PDAs, wireless phones, and other mobile devices) in a distributed network. The users are instructed via a server, connected to the clients through the network. The server has study plans of course units for each user. Study plans are customized for each user. Further, each client system has performance support tools, such as word translation or grammar checking, which not only help the users do their job, but also monitor the user's day-to-day activities at the device. Based on the user's use of the performance support tools, the study plans at the server may be modified to provide further customization of the e-learning experience for the user.

There are several benefits to doing this. Monitoring the user's day-to-day activities improves the quality and quantity of the data obtained. The system will be able to determine what the user's most frequent tasks are and what his or her weaknesses and strengths are. As a result, when the system uses this enhanced data to update the user's study plan, it will include only those activities which are directly relevant to the on-the-job needs of the user.

In an embodiment, the invention is a method of providing a course of study for a user having a number of course units, each course accessible by the user through a server. The user's activity is monitored using the performance support tools at a client system while the user is using an application program such as Microsoft Outlook that is running on the client system. The course of study can be altered based on the user's activity. The user may have to authorize the monitoring activity before it takes place. This may be done by asking the user for approval and having the user indicate approval in some fashion, such as clicking on a "yes" or "OK" button. There may also be a technique of revoking or removing approval after approval has been given.

Altering the course of study based on the user's activity may involve adding a new course unit to the course of study, removing a course unit, or replacing a course unit, or any combination of these. Monitoring the user's activity may include grammar checking, spelling checking, or translating words or phrases for the user. The performance support tool may be integrated with any application program such as a web browser toolbar at the client system.

In another embodiment, the invention is a method providing a course of study for a user having course units, each course accessible by the user through a server system. A user's input at a client system is monitored. A number of violations of a first rule in the user's activity is counted. When the number of violations of the first rule exceeds a threshold value, the course of study is altered. The method may further include counting a number of violations of a second rule, different from the first rule, in the user's input, and when the number of violations of the second rule exceeds a threshold value, altering the course of study.

In another embodiment, the invention is an on-line learning system having a performance support tool application executing on a client system, where the performance support tool monitors user input at the client computer device. The on-line learning system further includes a course of study for a user residing on a remote computing device, where the course of study is modified based on the monitored user input at the client system.

Other objects, features, and advantages of the present invention will become apparent upon consideration of the following detailed description and the accompanying drawings, in which like reference designations represent like features throughout the figures.

BRIEF DESCRIPTION OF THE INVENTION

DETAILED DESCRIPTION

Figure 1:
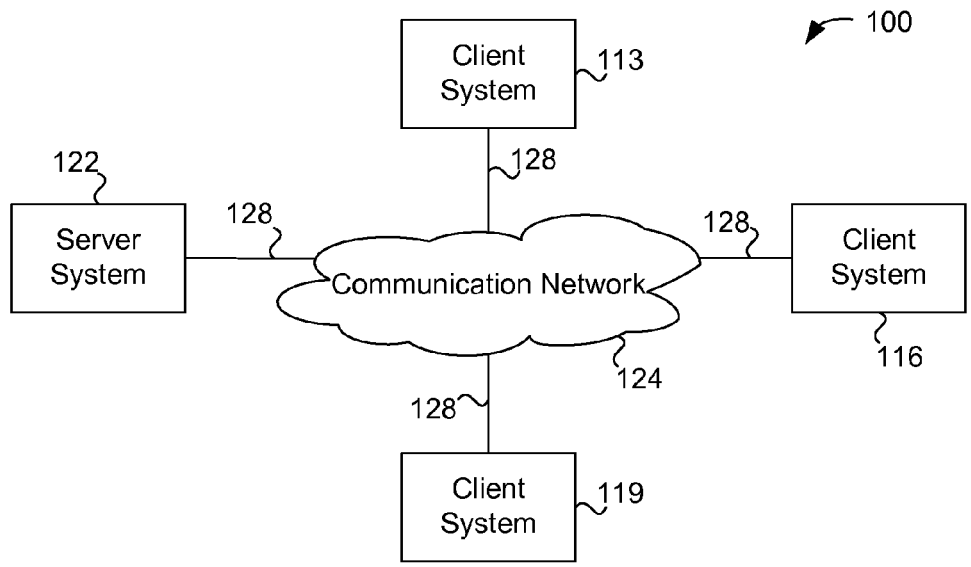
FIG. 1 shows a simplified block diagram of an e-learning system implemented in a distributed computing network connecting a server and clients.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may include many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although the invention has been described using a client-server environment, it should be apparent that the invention may also be embodied in a stand-alone computer system, peer-to-peer system, and others.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser program provided by Microsoft Corporation, and the Netscape browser provided by Netscape Communications Corporation, an America Online, Incorporated company.

Figure 2:
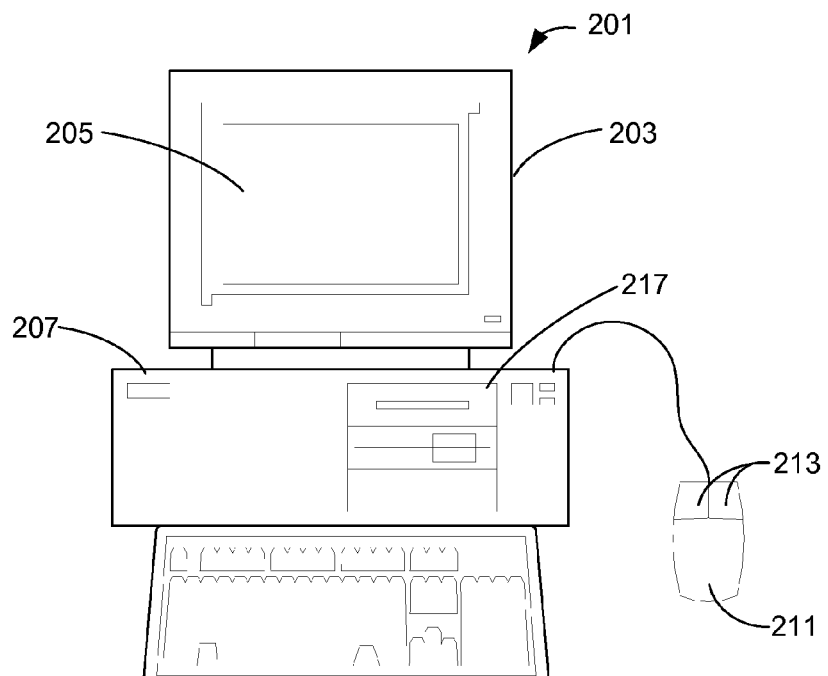
FIG. 2 shows a more detailed diagram of an exemplary client of the e-learning system.

FIG. 2 shows an exemplary client system of the present invention for performing on-line learning. In an embodiment, a user interfaces with the on-line learning system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like. Mass storage devices 217 may include mass disk drives, floppy disks, Iomega ZIP™ disks, USB removable storage, magnetic disks, fixed disks, hard disks, CD-ROMs, recordable CDs, DVDs, DVD-R, DVD-RW, Flash and other non-volatile solid-state storage, tape storage, reader, and other similar media, and combinations of these. A binary, machine-executable version, of the software of the present invention may be stored or reside on mass storage devices 217. Furthermore, the source code of the software of the present invention may also be stored or reside on mass storage devices 217 (e.g., magnetic disk, tape, or CD-ROM).

Figure 3:
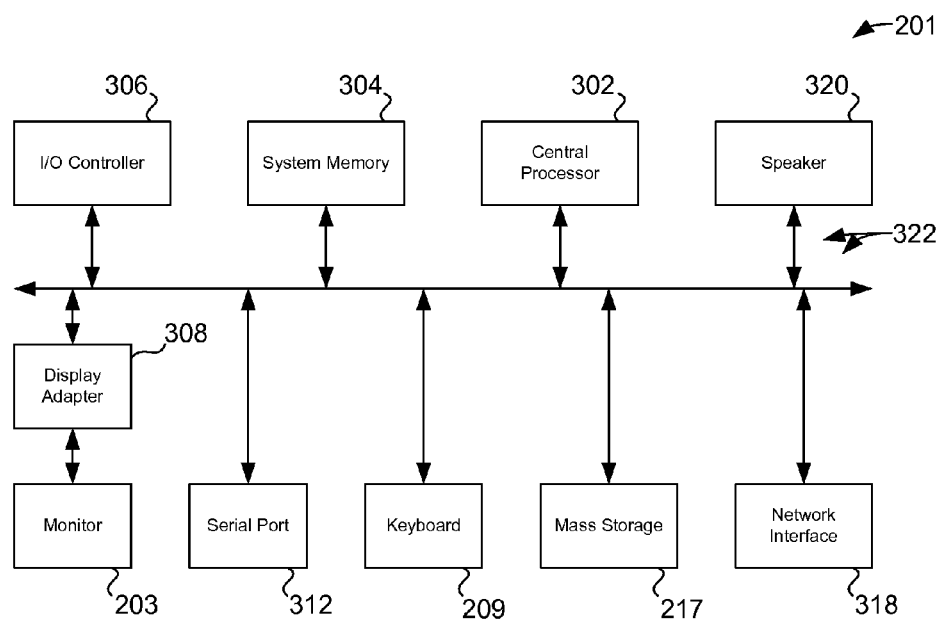
FIG. 3 shows a system block diagram of a client computer system used to execute application programs such as a web browser or performance support tools for the e-learning system.

Furthermore, FIG. 3 shows a system block diagram of computer system 201 used to execute the software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, Pascal, Fortran, Perl, MatLab (from MathWorks, www.mathworks.com), SAS, SPSS, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems). An operating system for the system may be one of the Microsoft Windows® family of operating systems (e.g., Windows 95, 98, Me, Windows NT, Windows 2000, Windows XP, Windows CE, Windows Mobile), Linux, UNIX, or Sun OS. Other operating systems may be used.

In an embodiment, with a web browser executing on a computer workstation system, a user accesses an e-learning system on the World Wide Web (WWW), through a network such as the Internet. The web browser is used to download web pages or other content in various formats including HTML, XML, text, PDF, and postscript, and may be used to upload information to other parts (e.g, e-learning server) of the e-learner system. The web browser may use uniform resource identifiers (URLs) to identify resources on the web and hypertext transfer protocol (HTTP) in transferring files on the web.

Figure 4:
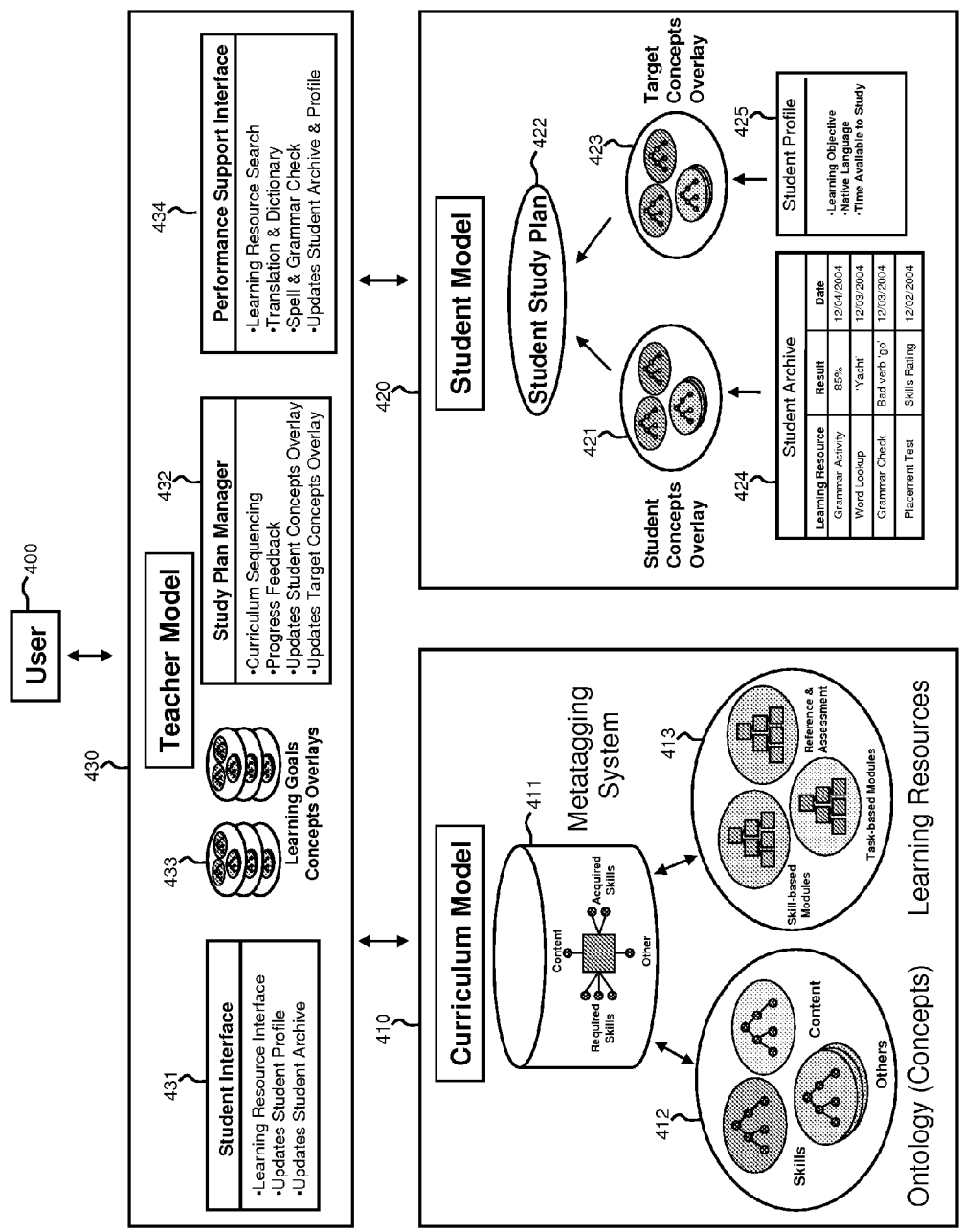
FIG. 4 shows an overview block diagram of components of an e-learning system.

FIG. 4 shows an architectural overview of an e-learning system of the invention. The system has a teacher model, interacting with a curriculum model and student model. A user interacts with the system through the teacher model.

A specific embodiment of such a system is IntelliTeacher by GlobalEnglish Corporation. IntelliTeacher is a trademark of GlobalEnglish Corporation. Via IntelliTeacher, GlobalEnglish offers comprehensive, high-quality English language instruction that is available to students or users anytime and anywhere they have access to the Internet. There is no need to schedule classes and no need to travel off-site, thus providing time and cost savings. Users get state-of-the-art on-line multimedia instruction, developed specifically for their needs. For example, business people will get instruction tailored for the business professional, and children will get instruction appropriate for them. Users can learn at their own pace, and can track their results.

Although a specific embodiment of the invention is directed to English language or foreign language instruction generally, the invention is also applicable to other types of e-learning including improvement in any basic skill such as reading, writing, and arithmetic and course work or instruction in any field such as anthropology, architecture, art, music, psychology, medicine, chemistry, science, business, religion, teaching, military science, electrical engineering, computer science, chemical engineering, and civil engineering. Furthermore, the example of an e-learning discussed in this patent has many concepts and features. However, an e-learning system of the invention may be implemented using any one concept or combination of the concepts discussed in this patent. The system presented in this patent may be modified as needed for the particular e-learning application.

Compared to traditional classroom instruction where each student goes through the same course work as other students in the class, a revolutionary feature of the invention is that the system builds a customized learning experience for each student or user. For example, a student who has difficulty with verb tenses may have a specific course unit added to the student's course of study to address this. And students who excel in a certain area may have one or more course units removed from a standard course of study. While interacting with each student, the system will continually monitor the student's activity and progress and modify the course of study as needed to provide a more optimal training system.

According to an aspect of the invention, the system monitors the student's activity within the e-learning system. According to another aspect of the invention, the system monitors the student's activity outside the e-learning system, such as when the student is writing e-mail at work, surfing the web using a web browser, writing a memo at the user's computer, on-line conferencing, and other activities. And the system can alter the existing course of study based on the information gathered while monitoring the student. Or the system can provide motivational messages. For example, when writing e-mails, the system may notice that the student makes many mistakes with plurals. The system may add course units in the student's course of study to help the student stop making such mistakes in the future. Therefore, using an e-learning system of the invention, students will learn faster and better compared to traditional classroom instruction.

Referring to FIG. 4, the e-learning system has a (1) curriculum model 410, (2) a student model 420, and (3) a teacher model 430.

First, the curriculum model provides the curriculum background for the e-learning system of the invention. In the curriculum model, there is a metatagging system 411, ontology or concepts 412, and learning resources 413. The metatagging system associates the ontology with the learning resources.

A backbone of the e-learning system of the invention is the ontology of the curriculum model. The role of an ontology is to formally describe a set of concepts used in a system. The ontology includes a hierarchy of concepts taught by the system. These concepts describe what the learning resource is about (i.e., what it teaches) and in which form it is presented. Below is an example of an ontology of the invention:

---
Skill->Grammar Hierarchy (portion of GlobalEnglish ontology)
---
I. Skill
   A. Grammar
      1. Verbs
         a. Causative Verbs
         b. Nonaction Verbs
         c. Passive
         d. Phrasal Verbs
         e. Special Verbs
         f. Verb Tenses
            i. Past
            ii. Simple Past
            iii. Present Perfect
            iv. Present Perfect Progressive
            v. Past Progressive
            vi. Past Perfect

---

Learning resources can be used in a variety of learning contexts such as test preparation, job specific skills training and on-the-job performance support. The metatagging system describes the relationship between the learning resources and relevant concepts in the ontology and other learning resources. Below is an example of the metatags used to describe a grammar activity:

---
Skill->Grammar->Verb->Verb Tenses->Present Perfect
Skill->Grammar->Verb->Verb Tenses->Present Perfect Progressive
Topic->Business->Marketing
Genre->Text->E-mail
Instructional Method->Workbook Exercise

---

Included in the learning resources are skill-based modules, task-based modules, and reference materials. Examples of skill-based modules are presentations, activities, assignments, quizzes, tests, and courses. An example of a task-based module is a real-world simulation. An example of a reference material includes translation dictionaries or cultural notes.

Second, there is the student model 420. There will be an instance of the student model or SM for each user. Each student model will have a current concepts overlay 421, a student study plan 422, a target concepts overlay 423, a student archive 424, and a student profile 425.

The student model 420 represents the system's current understanding of the user's knowledge, including their strengths and weaknesses, and includes a record of everything the user has done. The student model is initialized based on the information provided by the user such as learning objectives, native language, e-learning system initial assessment test, or other standardized test results. Each time the user interacts with the system, the student model is updated to reflect the user's current understanding of relevant concepts.

The target concepts overlay 423 represents the user's learning objectives in terms of the concepts in the system's ontology. In other words, the target concepts overlay represents the subset of concepts which the user wants or needs to learn.

The student profile 425 contains user attributes that are important for constructing the target concepts overlay 423. Some examples of attributes in the profile include a learning objective such as preparing for a test or improving specific on-the-job skills. Another attribute is a native language of the student, such as Japanese, Korean, Mandarin, Hindi, German, French, Spanish, Russian, and other languages. Another attribute in the profile may be the time available to study. Depending on whether the user has more or less time to study, the system will alter the course of study to achieve the student's objective in view of the time constraints. These are merely examples of some attributes and the profile may include other attributes not discussed here.

The student archive 424 is a record of the user's usage of learning resources with date and performance rating, or score. The student archive provides the evidence for the ratings in the student concepts overlay.

The student concepts overlay 421 represents the system's evaluation of how well the user has mastered each concept in the ontology 412. Each concept in the student concepts overlay is recorded with mastery rating range 0.0 to 1.0, and a confidence in that assessment ranging from 0.0 to 1.0. The confidence rating will be higher when the system has had greater or more opportunity to observe a student being evaluated on the concept. For example, the confidence rating will be higher when a student has passed a test on a concept two or more times, rather than just once. And the greater number of times a student passes a test or evaluation on a concept, the higher the confidence rating.

The student study plan 422 is an individualized learning path that guides the user to the desired target concepts overlay. The study plan may also be referred to as a course of study. The course of study may include individual course units. A course unit is a single unit of study and may be directed to a single concept or multiple concepts.

Third, there is the teacher model 430, including a student interface 431, a study plan manager 432, learning objective overlays 433, and a performance support interface 434.

The student interface 431 provides the user interface to all learning resources 413 and records users' performance in the student archive 424 and student profile 425.

The study plan manager 432 uses information from the student model 420 to create and maintain an individual learning path (i.e., study plan) for the user. The study plan manager consults the student model to ensure that the user is presented with the appropriate learning resource at the right time. The study plan manager can identify concepts the user is ready to learn while avoiding concepts they already know or are not ready to learn. At the appropriate times, the study plan manager makes recommendation for extra practice or to skip ahead in the study plan. The study plan manager is also responsible for updating the student concepts overlay with the latest results of the user's work.

The learning goals concepts overlays 433 are a set of heuristic rules and templates that map learning objectives to concepts in the system ontology. The result of this mapping is the generation of the target concepts overlay 423.

The performance support interface 434 handles matters including learning resource search, translation and dictionary, grammar checker, and simulation. This is the part of IntelliTeacher, which provides assistance and monitors the day-to-day user activities.

In a specific embodiment, a user studies English or other subject at a learning service provider web site or using a performance support tool, such as a browser toolbar, linked to the learning service provider. The teacher model records all of the users' actions in the student archive. When there is enough evidence to warrant a change to the study plan, the teacher model makes those changes. It examines the curriculum model to find content that will address the user's needs for further practice or information. The teacher model then updates the study plan with the new content from the curriculum model.

Figure 5:
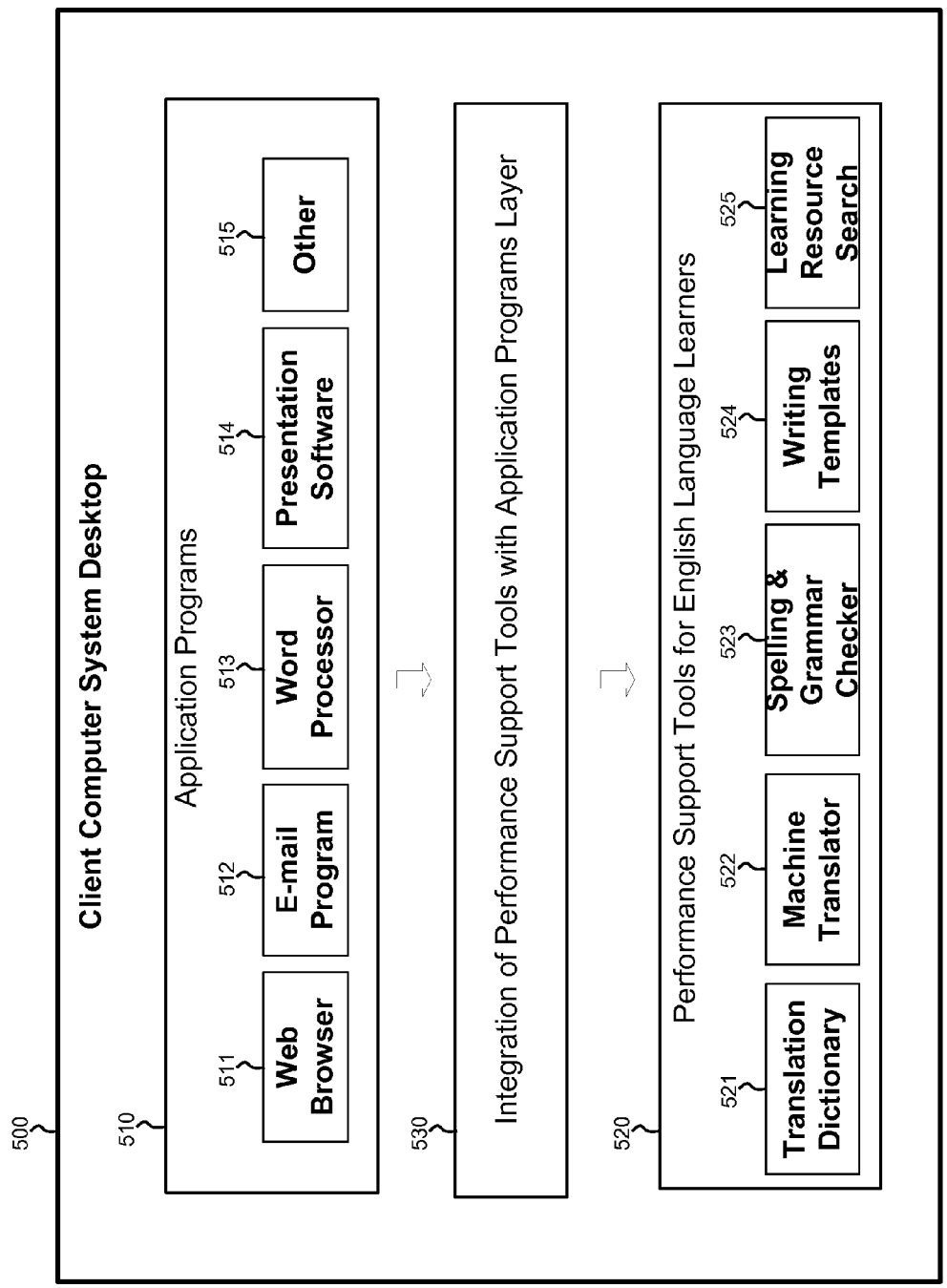
FIG. 5 shows a functional block diagram of a desktop at a client computer system.

FIG. 5 shows a functional block diagram of a desktop at a client computer system 500. A performance support tool 520 of the invention may be integrated with a variety of application programs 510, which may be made available to a user through the client system. The performance support tool monitors user activity at the client system. The block diagram of the desktop shows that the performance support tools may be used in a variety of application programs, such as web browsers 511, e-mail programs 512, word processors 513, presentation software 514 and any other application program 515. The performance support tools may contain a variety of resources, including a translation dictionary 521, a machine translator 522, a spelling and grammar checker 523, writing templates 524, and learning resource search 525. The performance support tools will also allow the user to access templates for creating common types of letters, e-mail messages and presentations.

More specifically, the desktop includes application programs the user or student may run on the client computer system. This desktop may be a menu system provided by an operating system such as Microsoft Windows XP. One application on the desktop is a web browser, such as Microsoft's Internet Explorer, Netscape Navigator, Mozilla Firefox, or Opera. Another application is an e-mail program such as Microsoft Outlook, Eudora, or Pegasus Mail. Another application is a word processing program such as Microsoft Word, WordPerfect, or WordStar.

Other applications include presentation software such as Microsoft PowerPoint and a translation tool such as a Spanish (or other non-English language) to English tool. The translation tool may be a tool-bar-type application integrated with another application. Some examples of resource available on the desktop include a dictionary, grammar checker, and spell checker. Some examples of templates on the desktop include an e-mail template, letter template, and PowerPoint template.

The e-learning system of the invention monitors activities of the student when the student uses one or more of the desktop applications (applications, resources, or templates mentioned above). Based on the student's activity, the e-learning system will alter the course of study to provide a better training for the student.

The patent provides merely examples of the types of activities that may be monitored at the user's client computer by way of a performance support tool. Any activity that occurs at the user's computer may be monitored, not just the activities specifically mentioned here. For example, the performance support tool may have voice recognition capabilities and evaluate conversations or other voice communications that occur using the client computer. An example is to monitor a web conference or voice-over-IP (VOIP) communication. Then, the performance support tool can evaluate the user's speech in order to improve the user's speaking ability, or the performance support tool may provide a translation of the spoken words on the screen, or other capabilities.

Figure 6:
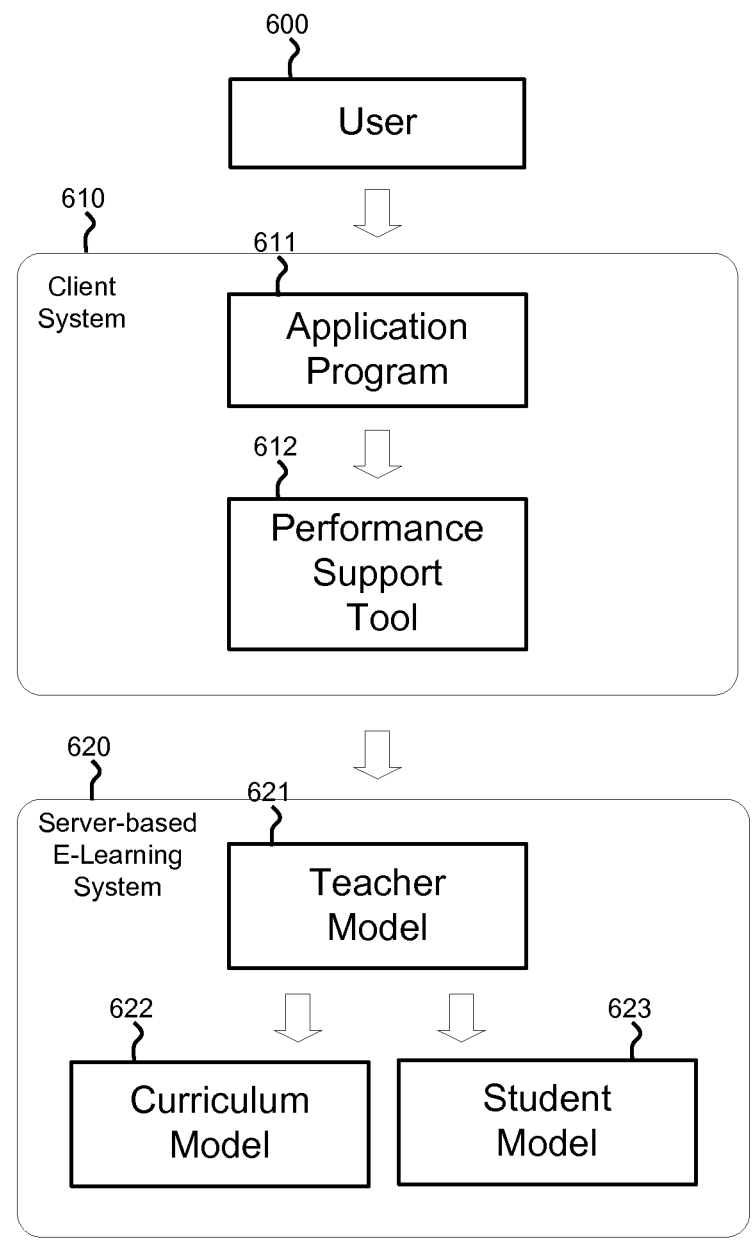
FIG. 6 shows a connection of a performance support tool with the e-learning system.

FIG. 6 shows a connection of a performance support tool 612 with the server-based e-learning system 620 of the invention. A user 600 of the e-learning system may use the performance support tool such as a web browser toolbar to further enhance the user's learning experience. The user will install the performance support tool on the user's client computer. The performance support tool will then be accessible to the user. Further, the user may authorize (or not authorize) the performance support tool to monitor activity on the computer for purposes of enhancing e-learning. For example, the performance support tool may track keystrokes of the user as the user is writing an e-mail or drafting a memo in a word processing program. The performance support tool may monitor grammar rules as the user is typing. And the performance support tool may offer suggestions to the user to correct grammar, spelling, or other errors the performance support tool detects.

In the example in the figure, the performance support tool could be a word or phrase translation tool. This translation tool may be one of a group of performance support tools, and may be presented to the user in a web browser toolbar interface. For example, upon clicking a button on the toolbar, the translation tool may pop-up in a window for the user to type or paste information to be translated. Or the translation tool may have a persistent user entry box in the toolbar. This patent discusses a translation tool merely as an example, and it is understood that the performance support tool may take many forms. The translation tool may be accessible via a web browser toolbar or another application, such as a word processor or e-mail program. The translation tool links to the e-learning server, typically through a network connection such as the Internet. The Internet may be accessed through wires, optical fiber, or wirelessly. The network connection may be made using, for example, a telephone, cable modem, DSL modem, T1 line, Wi-Fi, 802.11a, 802.11b, 802.11g, 802.11n, and many other connection types.

Upon receiving information from the translation tool, the teacher model 621 records all of the user's actions in the student archive (not shown) of the student model 623. When there is enough evidence to warrant a change to the study plan (not shown), the teacher model makes those changes. For example, changes to the course may be made if the user makes more than a particular number (such as 3, 4, 5, 6, 7, 8, 9, 10, 11, 12, 15, 25, or more) of errors in verb tense.

The teacher model will examine the curriculum model 622 to find content that will address the user's needs for further practice or information. For example, if the error is verb tense, then the teacher model searches for verb tense course units to add to the study plan or course of study. The teacher model then updates the study plan with the new content from the curriculum model. The next time the user accesses the e-learning system to continue the user's course work, the user will access course units according to the revised study plan.

Figure 7:
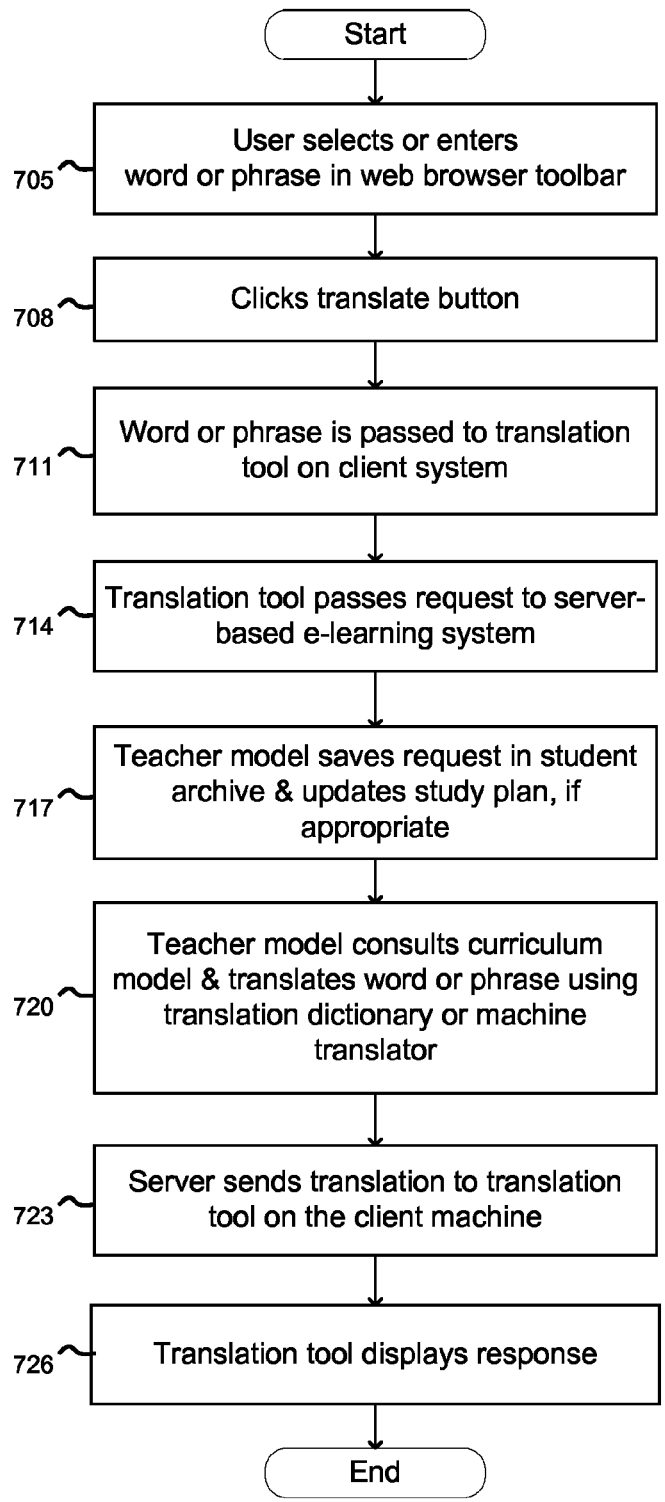
FIG. 7 shows a flow diagram of performance support tool integrating with the e-learning system.

FIG. 7 shows a flow diagram of a performance support tool integrating with the e-learning system. This flow diagram is representative of a user using a performance support tool. In this example, the flow diagram is for a translation tool and can be understood in connection with FIG. 6 above. Other applications may also be used, and the flow may be different for these different applications.

In a step 705, the user selects or enters a word or a phrase. In a step 708, the user clicks on the translate button. In a step 711, a word or phrase is passed to the translation application on the client machine. In a step 714, the translation application passes a request to the server system. In a step 717, the server system saves the request in an archive and updates the student model. In a step 720, the teacher model consults the student and curriculum models and translates the word or phrase. In a step 723, the server system sends the translation to the translation application. In a step 726, the translation application displays the response.

For example, the user may see the English word "cat" while surfing the web and does not understand the word. The user enters the word "cat" (or the word that is automatically input for the user) and clicks on translate. Then, the word "cat" is passed to the server system. The teacher model will consult the student model to determine what language the user uses. For example, the user may be a Spanish speaker. In an embodiment of the invention, the student model will also have information relating to a level of the user to which to translate the word or phrase. For example, if the user is a college-level user, the system will provide an appropriate college-level translation or definition.

Figure 8:
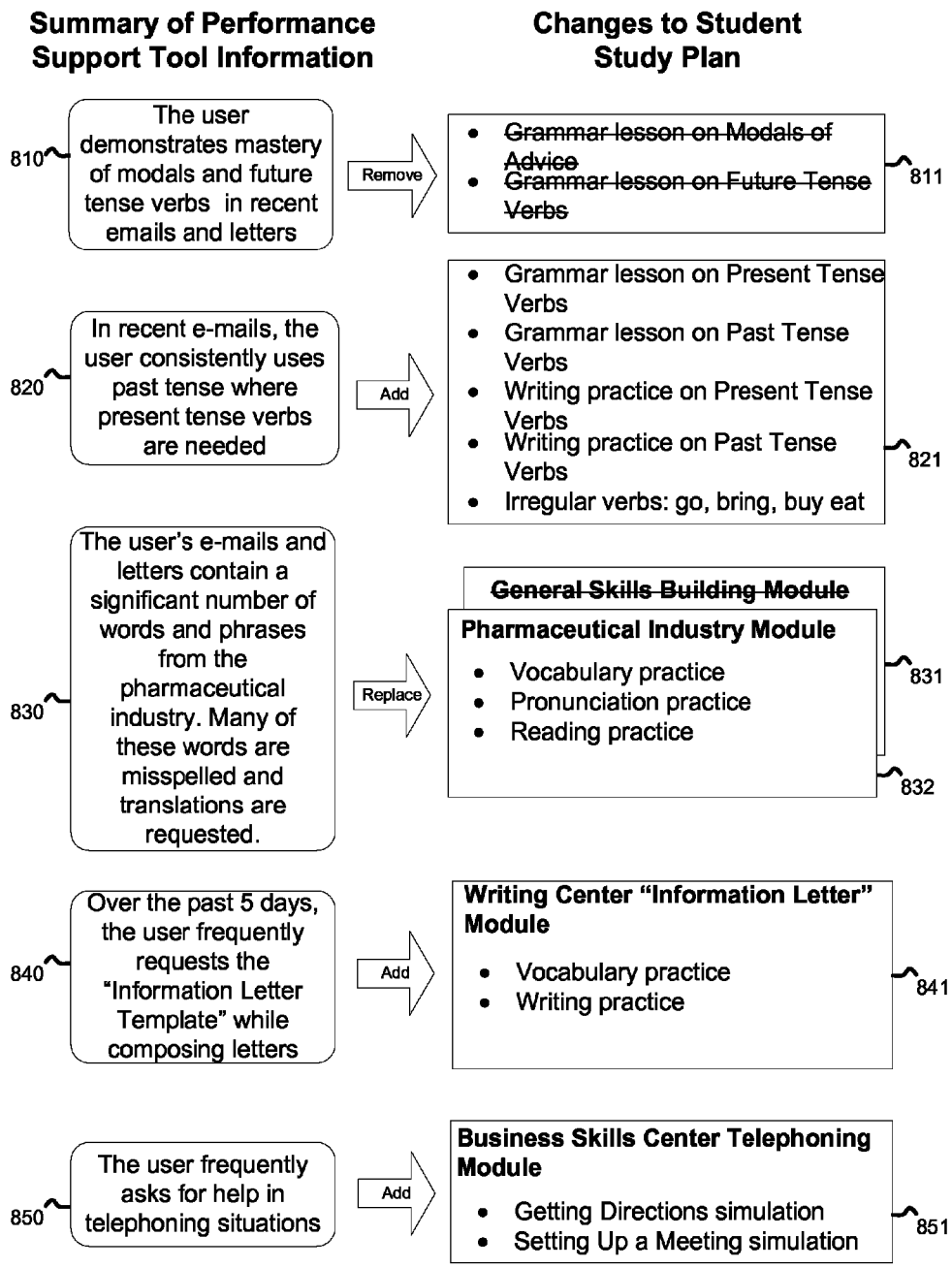
FIG. 8 shows a diagram of modifications to a student study plan based on information gathered by performance support tools.

FIG. 8 shows several examples of modifications of the student study plan based on information gathered by performance support tools. More specifically, these examples show the addition, removal, and replacement of course units from the student study plan.

In the first example, over the past two weeks, the user demonstrates mastery of modals and future tense verbs 810 by using them correctly over 90 percent of the time in e-mails and letters. As a result, the study plan manager removes all grammar lessons on modals and future tense verbs course units 811 from the student study plan.

In the second example, the user uses the past tense where present tense verbs 820 are needed 50 percent of the time. In addition, the user is having trouble with the past tense forms of the verbs: go, bring, buy, and eat. As a result, the study plan manager adds grammar lessons and writing practice course units 821 to the student study plan. In addition, a reference to irregular past tense verbs: go, bring, buy, and eat is added to the student study plan.

Past tense is used merely as an example of an error that is monitored. The system may monitor other types of errors; these may involve rules which the system is watching for, and where a rule is not met, a violation occurs. When the past tense mistake is made, the system may make a note that a violation of a past tense rule has occurred. One or more rules may be monitored by the system at one time. For example, 2, 3, 4, 5, 6, 7, 8, or more rules may be monitored at the same time. Examples of rules may include any grammar, stylistic, or punctuation rule, a spelling error, a repeated word, passive voice occurrence, wrong tense occurrence, wrong plural word occurrence, or others.

In the third example, the user's e-mails and letters contain a significant number of words and phrases from the pharmaceutical industry 830, many of the words are misspelled. In addition, 50 percent of the user's word and phrase translations are also from the pharmaceutical industry. As a result, the study plan manager replaces the general skills building module 831 with the pharmaceutical industry module. The pharmaceutical industry module focuses on teaching English skills using vocabulary and language common in the pharmaceutical industry.

In the fourth example, over the past five days, the user used the "Information Letter Template" on four different occasions 840. As a result, the study plan manager adds writing center "Information Letter" module 841 to the student study plan.

In the fifth example, the user frequently asks for help with telephoning situations. As a result, the study plan manager adds the business skills center telephoning module to the student study plan.

There are many combinations of the performance support tool support techniques described above. Any of the above techniques may be combined with each other. For example, course units may be substituted, added, or deleted from a course of study at the same time. Furthermore, the order of the course units in the course of study may be altered based on activities monitored by the performance support tool.

In an alternative embodiment of the invention, instead of monitoring the user's input and passing the monitored information to the server system in a real-time mode as discussed in connection with FIGS. 6, 7, and 8, the monitored information may be stored in a file at the client device. Then the recorded or monitored information is sent to the server in a batch fashion (i.e., after accumulating the results for multiple actions), rather than each time an action occurs. For example, the performance support tool may continue to accumulate and save information at the client computer until the next time the user logs into the server. Then, the recorded or saved performance support tool information is sent to the server when the user logs onto the e-learning system to continue with the study plan. And changes to the study plan are made at that time. By not sending information to the server as it is gathered real-time, but sending in "batches," this will reduce the load on the server.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. A computer-implemented method comprising:
providing by an e-learning system a course of study comprising a plurality of course units, wherein each course unit is accessible through a server by a client system of the user;
installing a performance support tool, separate from an application program, on the client system, to monitor a user's input to the application program;
monitoring the user's input to the application program running on the client system, wherein the application program does not connect to the server during the monitoring and the application program is a web browser, an email program, a word processor or a presentation software;
providing a performance support tool, separate from the application, to monitor the user's input to the application program;
transmitting from the performance support tool on the client system the user's input to the server;
altering the course of study, stored at the server, based on the user's input, wherein the altering the course of study comprises at least one of adding a course unit to the course of study, removing a course unit from the course of study, or replacing a course unit in the course of study; and
providing by the e-learning system the altered course of study to the user.

2. The method of claim 1 comprising:
providing an option in a user profile for the user to specify authorization of the monitoring on the client system, wherein the user profile is stored at the server.

3. The method of claim 1 wherein the monitoring of the user's input on the client system is in real time and comprises evaluating text of an e-mail according to grammar rules.

4. The method of claim 1 wherein the monitoring of the user's input on the client system is in real time and comprises providing a translation of a word in the English language into one or more words in a non-English language.

5. The method of claim 1 further comprising:
before the monitoring a user's input at the client system, displaying on a screen of the client system a message seeking authorization from the user to monitor the user's input on the client system.

6. The method of claim 1 wherein the monitoring of the user's input on the client system is through a tool bar interface of a web browser program.

7. A computer-implemented method comprising:
providing by an e-learning system a course of study comprising course units, each course unit is accessible by a client system of the user through a server;
installing a performance support tool executing on the client system;
monitoring a user's input to an application program running on the client system, wherein the application program does not connect to the server during the monitoring, the performance support tool at the client system connects to the server to transmit information on the user's input to the application program and the application program is a web browser, an email program, a word processor or a presentation software;
counting a number of violations of a first rule in the user's input;
when the number of violations of the first rule exceeds a threshold value, altering the course of study, wherein the altering the course of study comprises at least one of adding a course unit to the course of study, removing a course unit from the course of study, or replacing a course unit in the course of study; and
providing by the e-learning system the altered course of study to the user.

8. The method of claim 7 wherein the first rule comprise at least one of a grammar rule, a spelling error, a repeated word, passive voice occurrence, wrong tense occurrence, or wrong plural word occurrence.

9. The method of claim 7 further comprising:
counting a number of violations of a second rule, different from the first rule, in the user's input; and when the number of violations of the second rule exceeds a threshold value, altering the course of study.

10. An on-line learning system comprising:
a performance support tool application executing using a computer processor on a client system, wherein the performance support tool monitors a user's input of n characters to a software application running at the client system, wherein the software application is different from the performance support tool application, the software application is a web browser, an email program, a word processor or a presentation software and the performance support tool application sends the n characters to a remote computing device; and
a course of study for a user residing on the remote computing device, wherein the course of study is modified based on the monitored n characters input at the client system, wherein the modified course of study comprises at least one additional course unit in the course of study, one less course unit in the course of study, or one replaced course unit in the course of study and the on-line learning system is configured so that the on-line learning system provides the modified course of study to the user.

11. The system of claim 10 further comprising:
a network connection to pass information between the client system and remote computing device.

12. The system of claim 10 wherein the performance support tool application comprises at least one of a translation application, grammar checker application, or spelling checker application.

13. The method of claim 5 comprising:
permitting the monitoring of the user's input only after receiving an indication from the user authorizing the monitoring.

14. The method of claim 1 wherein the monitoring a user's input is in real time.

15. The method of claim 1 wherein the monitoring a user's input is in real time and the application program is a desktop word processing software application.

16. The method of claim 1 wherein the monitoring a user's input is in real time and the application program is a desktop e-mail software application.

17. The method of claim 1 wherein the user's input is vocal.

18. The method of claim 1 wherein the application program is an on-line communications program handling a voice input from the user.

19. The method of claim 1 wherein the application program is a voice-over-IP program.

20. The method of claim 7 further comprising:
before the monitoring a user's input at the client system, displaying on a screen of the client system a message seeking authorization from the user to monitor the user's input at the client system.

21. The method of claim 7 wherein the monitoring a user's input is in real time.

22. The method of claim 7 wherein the user's input is vocal.

23. The system of claim 10 wherein the performance support tool monitors the user's input in real time.

24. The system of claim 10 wherein the user's input comprises a vocal input.

25. The on-line learning system of claim 14 wherein the performance support tool application is executed on the client system after the software application is executed.

26. The on-line learning system of claim 14 wherein the performance support tool application and the software application are running concurrently at the client system.

27. The method of claim 1 wherein the user's input comprises text and the application program displays the text in a window of the application program on a screen of the client system.

28. The method of claim 1 wherein the user's input comprises text and the application program saves the text in a file stored at the client system.

29. The method of claim 1 wherein the monitoring of the user's input to the application program running on a client system, wherein the application program does not connect to the server during the monitoring comprises:
transmitting the user's input to the server, wherein the transmitted user's input is not a response to any data packets received from the server.

30. The method of claim 1 wherein the altering the course of study, stored at the server, based on the user's input further comprises:
at the server, evaluating whether the user's input violates a grammar rule for a nonmachine language; and
when the grammar rule is violated, adding a course unit to the course of study for the user.

31. The method of claim 30 wherein the nonmachine language is English.

32. The method of claim 1 wherein the altering the course of study, stored at the server, based on the user's input comprises:
at the server, evaluating whether the user's input violates a spelling rule for a nonmachine language; and
when the spelling rule is violated, adding a course unit for spelling to the course of study for the user.

33. The method of claim 1 wherein the altering the course of study, stored at the server, based on the user's input comprises:
at server, evaluating whether the user's input violates a wrong plural rule for a nonmachine language; and
when the wrong plural rule is violated, adding a course unit to the course of study for the user.

34. The method of claim 1 wherein the altering the course of study, stored at the server, based on the user's input comprises:
at the server, evaluating whether the user's input violates a repeated word rule for a nonmachine language; and
when the repeated word rule is violated, adding a course unit to the course of study for the user.

35. The method of claim 1 further comprising wherein the application program is a first application program and the monitoring a user's input to the first application program is performed by a second application program running on the client system, the method further comprises:
sending information associated with the user's input to the first application program over a network to the server; and
allowing the user to connect to the server to access the course of study over the network using a third application program running on the client system, wherein the third application program is a Web browser.

36. The method of claim 35 wherein the first application program is a word processor.

37. The method of claim 35 wherein the second application program is not the Web browser and not first application program.

38. The method of claim 35 wherein the second application program further comprises a spelling checker module, wherein when active, the spelling checker module can offer suggestions to correct spelling errors identified during the monitoring of the user's input to the first application program, and additionally,
  based on spelling errors identified, the second application program sends information over the network to alter the course of study at the server.

39. The method of claim 35 wherein the monitoring a user's input to an application program running on the client system is not performed by a Web browser application program.

40. The method of claim 1 further comprising:
  receiving from the client system a vocal input from a microphone of the client system.

41. A computer-implemented method comprising:
  providing an online course of study for a user comprising a plurality of course units, each course accessible by the user through a server and includes executable code comprising an interactive learning experience;
  monitoring a first user's input to a first application program running on a first client system, wherein the first application program does not connect to the server to transmit the monitored first user's input during the monitoring and the first application program is a web browser, an email program, a word processor or a presentation software;
  providing a first performance support tool, separate from the first application program, to monitor the first user's input to the first application program;
  transmitting from the first performance support tool the first user's input to the server;
  altering the online course of study to create a first altered online course of study, stored at the server, based on the first user's input, wherein the altering the online course of study comprises at least one of adding a course unit to the online course of study, removing a course unit from the online course of study, or replacing a course unit in the online course of study; and
  a next time the user accesses the online course of study, providing the first altered online course of study to the user.

42. The computer-implemented method of claim 41 further comprising:
  monitoring a second user's input to the application program running on a second client system, wherein the application program running on the second client system does not connect to the server to transmit the monitored second user's input during the monitoring;
  providing the performance support tool, running on the second client system, to monitor the second user's input to the application program running on the second client system;
  transmitting from the performance support tool, running on the second client system, the second user's input to the server; and
  altering the online course of study to create a second altered online course of study, stored at the server and different than the first altered online course of study, based on the second user's input.

43. The method of claim 41 further comprising:
  monitoring the first user's input to a second application program running on the first client system, wherein the second application program does not connect to the server to transmit the monitored first user's input to the second application program during the monitoring,
  the first performance support tool is separate from the second application program, and
  the first performance support tool monitors the first user's input to the second application program;
  transmitting from the first performance support tool the first user's input to the second application program to the server; and
  altering the online course of study to create a second altered online course of study, stored at the server, based on the first user's input to the second application program.

* * * * *